United States Patent

Shaw et al.

[11] Patent Number: 5,241,978
[45] Date of Patent: Sep. 7, 1993

[54] AUTOMATIC SPRINKLER CONTROL OVERRIDE SYSTEM

[76] Inventors: David C. H. Shaw; Judy Z. Z. Shaw, both of 3312 E. Mandeville Pl., Orange, Calif. 92667

[21] Appl. No.: 958,199

[22] Filed: Oct. 8, 1992

[51] Int. Cl.⁵ .............................................. F16K 17/36
[52] U.S. Cl. ................................. 137/78.2; 137/392; 239/65; 200/84 R
[58] Field of Search ............... 137/392, 78.2, 544, 137/545, 550; 239/65; 200/84 R

[56] References Cited

U.S. PATENT DOCUMENTS

| | | | |
|---|---|---|---|
| 2,517,195 | 8/1950 | Gaspar | 137/544 |
| 3,118,606 | 1/1964 | Rotunda | 137/78.2 |
| 3,212,714 | 10/1965 | Davis et al. | 137/78.2 |
| 3,422,833 | 1/1969 | Kitrilakis | 137/78.2 |
| 3,500,844 | 3/1970 | Sanner | 137/78.2 |
| 4,541,446 | 9/1985 | Hogan | 137/78.2 |
| 4,919,165 | 4/1990 | Lloyd | 137/78.2 |

Primary Examiner—A. Michael Chambers
Attorney, Agent, or Firm—Henderson & Sturm

[57] ABSTRACT

An apparatus (10) for overriding an automatic timer controlled sprinkler system (100); wherein, the apparatus (10) comprises a float member (60) disposed within a two stage screen member (30) secured within a receptacle member (20); and, wherein, the float member (60) is operatively associated with a switch member (50) suspended above the receptacle member (20) for interrupting the flow of electrical current to an automatic timer controlled sprinkler system (100) in response to the level of collected rainwater within the receptacle member (20).

5 Claims, 2 Drawing Sheets

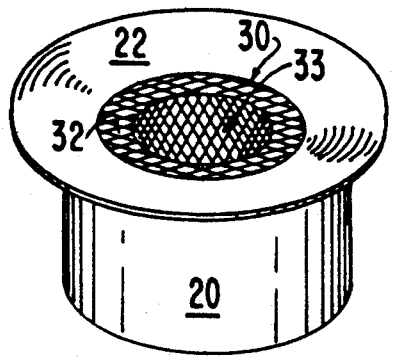
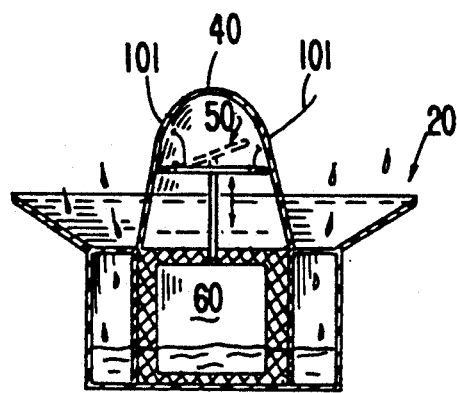
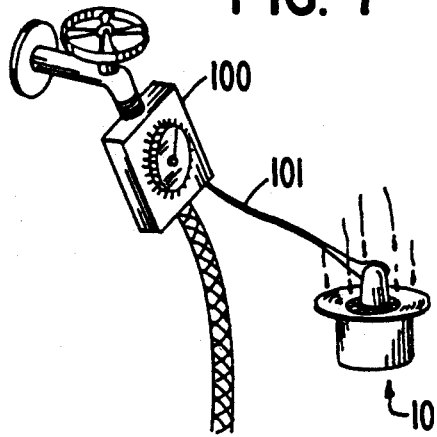
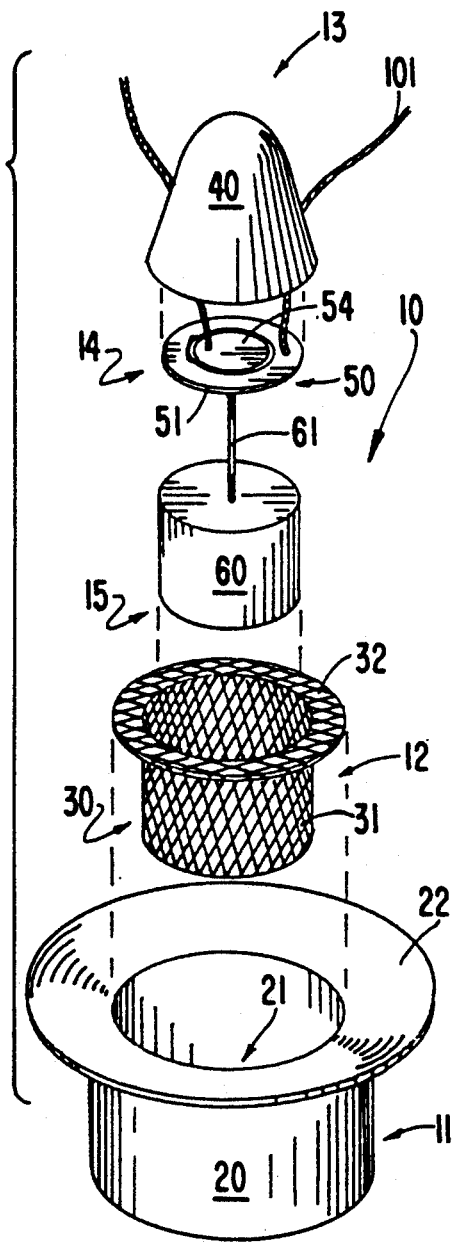

AUTOMATIC SPRINKLER CONTROL OVERRIDE SYSTEM

TECHNICAL FIELD

The present invention relates to the field of automatic sprinkler control systems in general, and in particular to a condition responsive override system that will disable the automatic sprinkle control system during periods of heavy rain or the like.

BACKGROUND ART

This invention was the subject matter of Document Disclosure Program Registration No. 303,838 which was filed in the U.S. Patent and Trademark Office on Mar. 16, 1992.

As can be seen by reference to the following U.S. Pat. Nos. 3,750,950; 3,407,608; 2,785,007; and 3,127,108; the prior art is replete with myriad and diverse automatic condition responsive sprinkler control arrangements.

While all of the aforementioned prior art constructions are more than adequate for the basic purpose and function for which they have been specifically designed, these patented arrangements normally incorporate a condition responsive mechanism into the automatic control system per se; and they do not address the problem faced by existing timer controlled automatic sprinklers that are not equipped with a condition responsive override switch that will temporarily disable the timer mechanism from activating the sprinkler system during periods of ample rainfall.

As a consequence of the foregoing situation, there has existed a longstanding need among owners of timer actuated automatic sprinkler systems for a condition responsive override system that can be incorporated into their existing systems to insure that the sprinkler system is disabled during periods of either ample or excessive rainfall; and, the provision of such a construction is a stated objective of the present invention.

DISCLOSURE OF THE INVENTION

Briefly stated, the override system that forms the basis of the present invention comprises in general: a housing unit; a screen unit; a cover unit; a switch unit; and, a float unit.

The housing unit comprises in general a receptacle member defining a reservoir for rainwater; wherein, the receptacle member is further provided with a funnel shaped lip element that will assist in the collection of rainwater.

The screen unit comprises a two stage screen member that will limit the amount of debris that can accumulate both generally within the interior of the receptacle member, and specifically with regard to the central interior portion of the receptacle member.

In addition the screen member forms a support surface for the cover unit; wherein, the switch unit is operatively deployed within the cover unit and connected by electrical leads to the control circuitry of a conventional timer actuated sprinkler system; and, the float unit is disposed within the receptacle member and operatively connected on one end to the switch unit to interrupt the flow of current through the automatic sprinkler system when a certain amount of rainwater accumulates within the receptacle member.

As will be explained in greater detail further on in the specification, the float unit is disposed in the central portion of the receptacle member; and, it is very important to the operating characteristics of this override system that debris be prevented from accumulating beneath the float unit; so as to preclude the inadvertent tripping of the switch unit during dry periods, due to the presence of debris beneath the float unit.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 5 is an isolated perspective view of the housing unit and screen unit;

FIG. 6 is a cross-sectional view of the override apparatus during wet conditions;

FIG. 7 is a perspective view of the override apparatus operatively attached to a timer actuated sprinkler system; and, FIG. 8 is an exploded perspective view of the override apparatus.

BEST MODE FOR CARRYING OUT THE INVENTION

Figure 1:
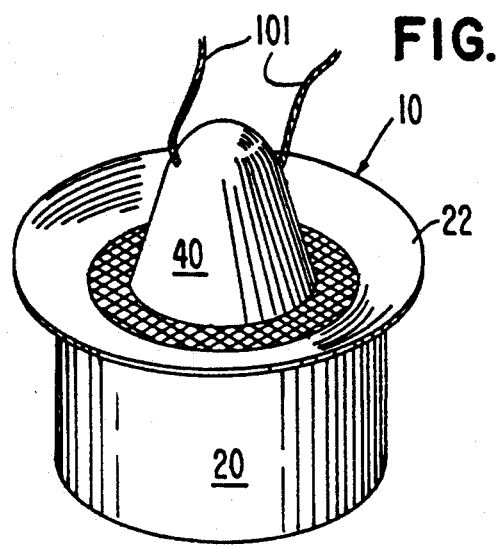
FIG. 1 is an isolated perspective view of the override apparatus that forms the basis of the present invention.
Figure 2:
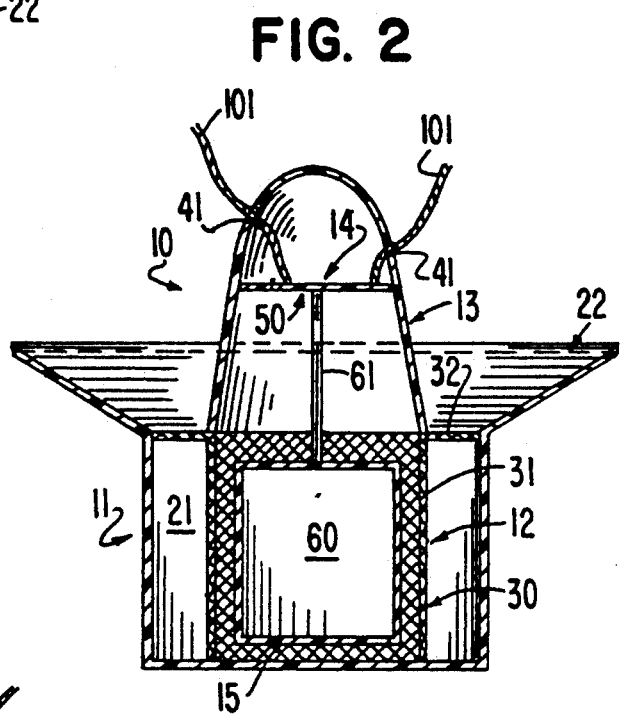
FIG. 2 is a cross-sectional view of the override apparatus during dry conditions.

As can be seen by reference to the drawings, and in particular to FIG. 1, the automatic sprinkler control override apparatus that forms the basis of the present invention is designated generally by the reference numeral (10). The apparatus (10) as depicted in FIGS. 2 and 8 comprises in general: a housing unit (11); a screen unit (12); a cover unit (13); a switch unit (14); and a float unit (15). These units will now be described in seriatim fashion.

As shown in FIGS. 2 and 8, the housing unit (11) comprises a generally cylindrical receptacle member (20) defining a fluid reservoir (21); wherein, the upper end of the receptacle member (20) is provided with an enlarged generally funnel shaped lip element (22) whose purpose is to collect and direct rainwater into the interior of the fluid reservoir.

Still referring to FIGS. 2 and 8, it can be seen that the screen unit (12) comprises a two stage screen member (30) having a generally cylindrical vertically oriented central portion (31) whose upper end is provided with a horizontally disposed peripheral lip portion (32); wherein, the peripheral lip portion (32) is dimensioned to contact the upper end of the receptacle member (20) in an abutting fashion; and, wherein the purpose and function of the two stage screen member will be described in greater detail further on in the specification.

Figure 3:
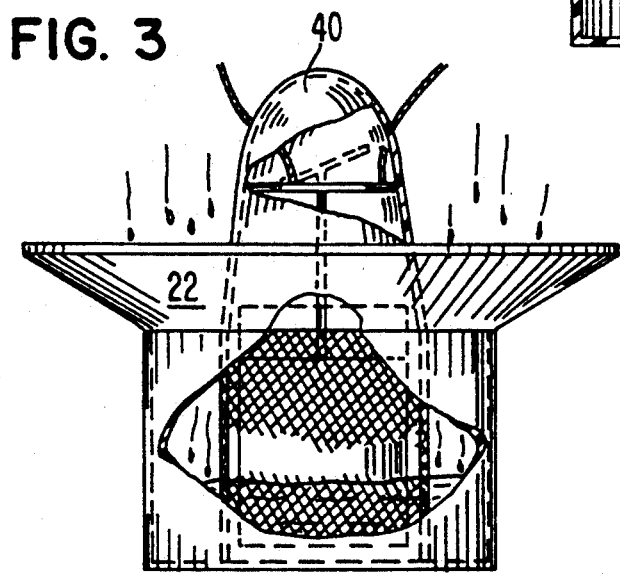
FIG. 3 is a partial cross-sectional view of the override apparatus during wet conditions.

Turning now to FIGS. 2, 3 and 6, it can be seen that the cover unit (13) comprises a generally elongated dome shaped cover member (40) which is supported by the screen member (30) and provided with a pair of discrete apertures (41) which are dimensioned to receive electrical leads (101) from an automatic timer controlled sprinkler system (100).

Figure 4:
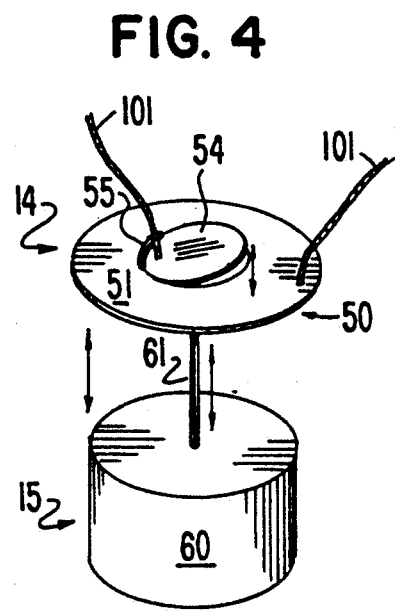
FIG. 4 is an isolated perspective view of the float unit and switch unit.

As shown in FIGS. 2, 4 and 8, the switch unit (14) comprises a switch member (50) which includes: an annular conductive ring element (51) secured on its outer periphery to the interior of the cover member (40) at a point which is disposed above the level of the lip element (22) of the receptacle member (20); and a disk shaped switch (54) which is pivotally secured as at (55) to one interior edge of the ring element (51).

Still referring to FIGS. 2, 4 and 8, it can be seen that the float unit (15) a generally closed end hollow cylindrical float member (60), having a stem element (61) attached to and projecting upwardly from the top of the float member (60); wherein the stem element (61) is adapted to contact the bottom of the switch (54) to lift the switch out of electrical contact with the conductive ring element (51).

As can be seen particularly by reference to FIG. 4, one of the electrical leads (101) is attached to the conductive ring (51), and the other electrical lead (101) is affixed to the conductive disk shaped switch (54); wherein, the hinge (55) is fabricated from an electrically insulated material, such that when the switch is in the closed position depicted in solid lines in FIGS. 2 and 3, electrical current will flow between the electrical leads (101); and, when the switch (54) is in the open position as depicted in FIG. 4, electrical current will be interrupted.

As can best be seen by reference to FIGS. 6 and 7, during dry periods the float member (60) will rest on the bottom of the receptacle member (20), with the switch member (54) being in the closed position as depicted in the solid lines of FIG. 6. During this time period electrical current will be flowing through the electrical leads (101) such that the timer controlled automatic sprinkler system (100) will function in its intended manner.

However, during rainy weather, the cover member (40) and the lip element (22) of the receptacle member (20) will funnel rainwater into the reservoir (21) of the receptacle member (20). Once the level of the accumulated rainwater reaches a predetermined height the float member (60) will rise within the reservoir (21) and the float member stem (61) will pivot the switch (54) into the open position thereby disabling the automatic sprinkler system (100) until the water level drops within the reservoir due to evaporation.

It should also be noted at this juncture that the rainwater must pass through both stages of the two stage screen member (30), wherein, the horizontal lip portion (32) serves as the first stage screen which will prevent debris from entering into the reservoir (21) per se; while the cylindrical central portion (31) of the screen member (30) surrounds the float member (60) and serves as the second stage screen, which will prevent debris from accumulating beneath the float member (60) such that the switch (54) will be kept in the open position even during prolonged dry periods.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

We claim:

1. An automatic sprinkle control override apparatus for interrupting the flow of current to a timer controlled automatic sprinkler system; wherein, the apparatus comprises:

a receptacle member defining a fluid reservoir;

a two stage screen member including a generally cylindrical central portion and a generally horizontally disposed lip portion which extends outwardly from the central portion into an abutting relationship with the interior of said reservoir;

a switch member suspended above the central portion of the screen member; wherein, the switch member is operatively connected to said automatic sprinkler system; and, float means associated with said switch interrupting the flow of current to said automatic sprinkler system.

2. The apparatus as in claim 1; wherein, said receptacle member is further provided with an outwardly projecting peripheral lip element which will funnel rainwater into said fluid reservoir.

3. The apparatus as in claim 2; further comprising a cover member which is dimensioned to overlie the central portion of said screen member; wherein said cover member projects a substantial distance above said receptacle member and peripheral lip element and forms a housing for said switch member.

4. The apparatus as in claim 3; wherein, said switch member comprises an electrically conductive annular ring and an electrically conductive switch connected to said annular ring by an electrically insulated hinge.

5. The apparatus as in claim 1; wherein, said float means are disposed within the central portion of said screen member.

* * * * *